(12) United States Patent
Kasa et al.

(10) Patent No.: US 9,384,183 B2
(45) Date of Patent: Jul. 5, 2016

(54) METHOD AND SYSTEM FOR REPORTING WEB STANDARD NON-COMPLIANCE OF WEB PAGES

(75) Inventors: Navin Kasa, Andhra Pradesh (IN); Jai Ganesh, Karnataka (IN)

(73) Assignee: Infosys Limited, Karnataka (IN)

( * ) Notice: Subject to any disclaimer, the term of this patent is extended or adjusted under 35 U.S.C. 154(b) by 291 days.

(21) Appl. No.: 13/180,207

(22) Filed: Jul. 11, 2011

(65) Prior Publication Data

US 2012/0254723 A1   Oct. 4, 2012

(30) Foreign Application Priority Data

Mar. 31, 2011   (IN) ............................. 1053/CHE/2011

(51) Int. Cl.
*G06F 17/00* (2006.01)
*G06F 17/27* (2006.01)
*G06F 17/21* (2006.01)

(52) U.S. Cl.
CPC ............ *G06F 17/272* (2013.01); *G06F 17/211* (2013.01); *G06F 17/2725* (2013.01)

(58) Field of Classification Search
CPC ............................... G06F 17/20; G06F 17/211
USPC ................................................. 715/234, 324
See application file for complete search history.

(56) References Cited

U.S. PATENT DOCUMENTS

| | | | | |
|---|---|---|---|---|
| 6,895,551 B1* | 5/2005 | Huang et al. | | 715/205 |
| 7,584,435 B2* | 9/2009 | Bailey et al. | | 715/788 |
| 8,090,800 B2* | 1/2012 | Yee | | 709/219 |
| 8,578,499 B1* | 11/2013 | Zhu et al. | | 726/25 |
| 2002/0156799 A1* | 10/2002 | Markel et al. | | 707/202 |
| 2006/0277212 A1* | 12/2006 | Error | | 707/102 |
| 2006/0282771 A1* | 12/2006 | Vinci | | 715/530 |
| 2006/0288283 A1* | 12/2006 | Schrepp et al. | | 715/700 |
| 2009/0319927 A1* | 12/2009 | Beeman et al. | | 715/764 |
| 2010/0131797 A1* | 5/2010 | Ganesh et al. | | 714/21 |

OTHER PUBLICATIONS

Abdo Beirekdar et al, Flexible Reporting for Automated Usability and Accessibility Evaluation of Web Sites, 2005, Interact 2005, LNCS 3585, pp. 281-294.*
Carlos Benavidez, Testing Accessibility With Style, 2005, <sidar.org/hera/index.php>.*
Wave Version 4.0, <web.archive.org/web/20080201032051/http://wave.webaim.org>, Feb. 2008.*

* cited by examiner

*Primary Examiner* — Mohammed-Ibrahim Zuberi
(74) *Attorney, Agent, or Firm* — Michael Best & Friedrich LLP (57) ABSTRACT

A method and system for reporting web standard non-compliance of web pages is provided. The method includes receiving a local copy of the web page to be tested for web standard non-compliance. The method further includes determining a set of errors on the web page corresponding to a user specified accessibility guideline. Thereafter an HTML overlay report is generated based on the determined set of errors. Further, a set of controls is generated based on the user specified accessibility guideline, the local copy and the set of errors. Finally, one or more controls are selected from the set of controls and based on the one or more selected controls and the determined set of errors one or more images are associated with each HTML element non-conformant to the accessibility guideline on the web page.

33 Claims, 5 Drawing Sheets

METHOD AND SYSTEM FOR REPORTING WEB STANDARD NON-COMPLIANCE OF WEB PAGES

FIELD OF INVENTION

The invention relates generally to the field of web accessibility. More particularly, the invention relates to a method and system for reporting web standard non-compliance of web pages.

BACKGROUND OF THE INVENTION

With advances in technology, information has become accessible via various resources. Papers have now been replaced with electronic documents that can be accessed using websites on the Internet on the World Wide Web. However, websites need to serve users regardless of their physical and psychological backgrounds. People who are disabled or differently-abled should be able to access information on the Internet without any difficulties. Web accessibility is the practice of developing websites that are easily accessible by people of different abilities or by people having disabilities.

People with disabilities include people having blindness, deaf or hard of hearing users, low-vision users, color blind users, users with motor disability impairing use of a keyboard or a mouse, and users with cognitive disabilities. Challenges faced by disabled people include, inability of visually challenged users to read images inability of hearing impaired users to access audio, inability of monochrome device users to differentiate between colors, and inability of old people to read small font text. Further, since a lot of Internet use nowadays relate to access and utilization of entertainment content, websites are generally designed using audio, video and colorful content including the use of images. For visually challenged users, screen reader softwares which read and interpret text on a screen cannot read images and this causes a lot of inconveniences to users of screen reader softwares. Users having cognitive disabilities include users having problems related to memory, problem-solving, attention, visual comprehension etc. Challenges faced by people having cognitive disabilities include, getting distracted by scrolling text, blinking icons or multiple pop-ups on a webpage, inability of people having visual comprehension difficulties in correlating photograph of a person with representation of a person, inability of a person with problem solving difficulties in navigating webpages with bad links etc. The accessibility challenges get intensified for web applications for interactive information sharing such as Web 2.0 applications because for such applications, users tend to be content producers and may not be able to produce accessible content.

To deal with the various challenges faced by users with disabilities, several standards and best practices have been developed to enable a web designer to make accessible web pages. The World Wide Web Consortium (W3C) is an international standards organization that regularly publishes web accessibility guidelines for web designers to design web accessible content. However, for the considerable volume of web pages already existing on the Internet, the task of employing skilled web designers to manually access web pages and point out non-adherence to standards as per W3C is very cumbersome and costly.

Methods and systems exist in the prior art for automatic web standard compliance testing for example, accessibility or usability testing of a website. In a web standard compliance testing, the HTML source of the web page is parsed and each HTML element is checked for its relevant web standard compliance. The most commonly used formats for output reports of such testing are HTML, XML, PDF, CSV and EARL. In all of these formats the actual HTML element on which the non-compliance of a standard is identified, is referred with a line number. This line number represents the position of the line in the HTML source code, on which the code for the HTML element begins. Though this approach helps testers and web developers in identifying the points of non-compliance, it has certain drawbacks.

Majority of the websites and web applications are developed using server-side web development technologies like ASP.NET, JAVA and PHP. Along with these technologies, WYSIWYG editors are used which helps the developers in visualizing the final rendered view of a web page. These development practices make web developers feel more comfortable with the back end code or the actual rendered view of the web page than with the automatically generated HTML and JavaScript code. Therefore a line number approach may not be of effective use to a web tester or developer, at least in cases where very large html and JavaScript codes are generated by server-side code. Thus, there is a need for a method of reporting web standard non-compliance that provides a more efficient way of referring to the points of non-compliance.

Moreover, the existing web standards non-compliance testing and reporting methods and systems provide an ad-hoc display of all the instances of web standard non-compliance on a web page with no degree of control over viewing such web standard non-compliance instances. The existing web standards non-compliance testing and reporting methods do not provide the users for example web testers, with flexibility to conduct testing and maintenance in a planned manner, phase wise manner. Thus, in view of the foregoing drawbacks of the existing web standards non-compliance testing and reporting methods and systems there is a need for methods and systems of web standards non-compliance testing and reporting which provide a high degree of control over viewing web standard non-compliance instances and facilitate flexible planned phase wise testing and maintenance of web standards non-compliance.

SUMMARY OF THE INVENTION

A method and system for reporting web standard non-compliance of a web page is provided. In various embodiments of the present invention, the system includes a user interface configured to receive a local copy of the web page to be tested for web standard non-compliance and an accessibility guideline from a user. Further the system includes a parser configured to parse the web page to extract one or more HTML elements and an application server configured to run scans on the web page. The system further includes a reporting module configured to present an HTML overlay report for web standard non-compliance and a control panel comprising dynamically generated set of controls based on the accessibility guideline, the local copy and a set of errors generated by the application server and configured to receive a user selection of at least one control and further configured to customize the HTML overlay report by associating at least one image with each HTML element on the web page.

In an exemplary embodiment of the present invention, the web standard non-compliance reporting is offered as an internet service. In another exemplary embodiment, the web standard non-compliance reporting is offered as an intranet service. In yet another embodiment, the web standard non-compliance reporting is offered as an offline service. In yet another embodiment, the web standard non-compliance reporting is offered in a SaaS mode.

In an exemplary embodiment of the present invention, the set of controls comprises accessibility parameters derived from the user specified accessibility guidelines.

In an exemplary embodiment of the present invention, the image represents a specific web standard non-compliance error. In an example, the image is color coded corresponding to its criticality with respect to the different accessibility guidelines.

In an exemplary embodiment of the present invention, the customized HTML overlay report further comprises details of the one or more errors associated with each HTML element on the web page. In an example, the details comprises a description of the error stored in a repository. In another example, the details comprises an address to the accessibility guideline definition.

Further the system of the present invention comprises a report builder configured to generate an HTML overlay report. The report builder is further configured to provide the report to the reporting module for presentation.

Further the system of the present invention comprises maintaining a real time web page state of the local copy of the web page received for web standard non-compliance testing by downloading relevant files. In an example, the relevant files comprise media files, script files and style sheet files.

In an embodiment of the present invention, method comprises receiving a local copy of the web page to be tested. Further the method comprises determining a set of errors on the web page wherein an HTML overlay report is generated based on the set of errors, generating a set of controls, selecting at least one control from the set of controls and associating at least one image with each HTML element on the web page corresponding to the set of errors and the one or more selected controls.

Further the method of the present invention comprises, maintaining a real time web page state of the local copy by downloading relevant files. In an example, the relevant files are selected from the group consisting of media files, script files and style sheet files.

Further the method of the present invention comprises, providing recommendations for remedying the one or more errors associated with each HTML element on the web page.

BRIEF DESCRIPTION OF THE DRAWINGS

The present invention is described by way of embodiments illustrated in the accompanying drawings wherein.

DETAILED DESCRIPTION

A method and system for reporting web standard non-compliance of web pages is described herein. The present invention is an automated system and method that provides a web-based interface to a user for receiving local copy of a web page and type of accessibility guideline to be used. In addition to providing web standard non-compliance reports to a user, the system also provides methods to customize the web standard non-compliance report based on the related accessibility guidelines to empower the users to conduct planned phase wise testing of web standard non-compliance occurrences on web pages. In an exemplary embodiment, the system of the invention may be delivered to a customer, such as an organization in Software as a Service (SaaS) mode. The organization may use the service to make one or more of their websites accessible.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention. As such, the present description should be considered as merely illustrative of the principles of the present technique and not in limitation thereof, since the present technique is defined solely by the claims.

The present invention would now be discussed in context of embodiments as illustrated in the accompanying drawings.

Figure 1:
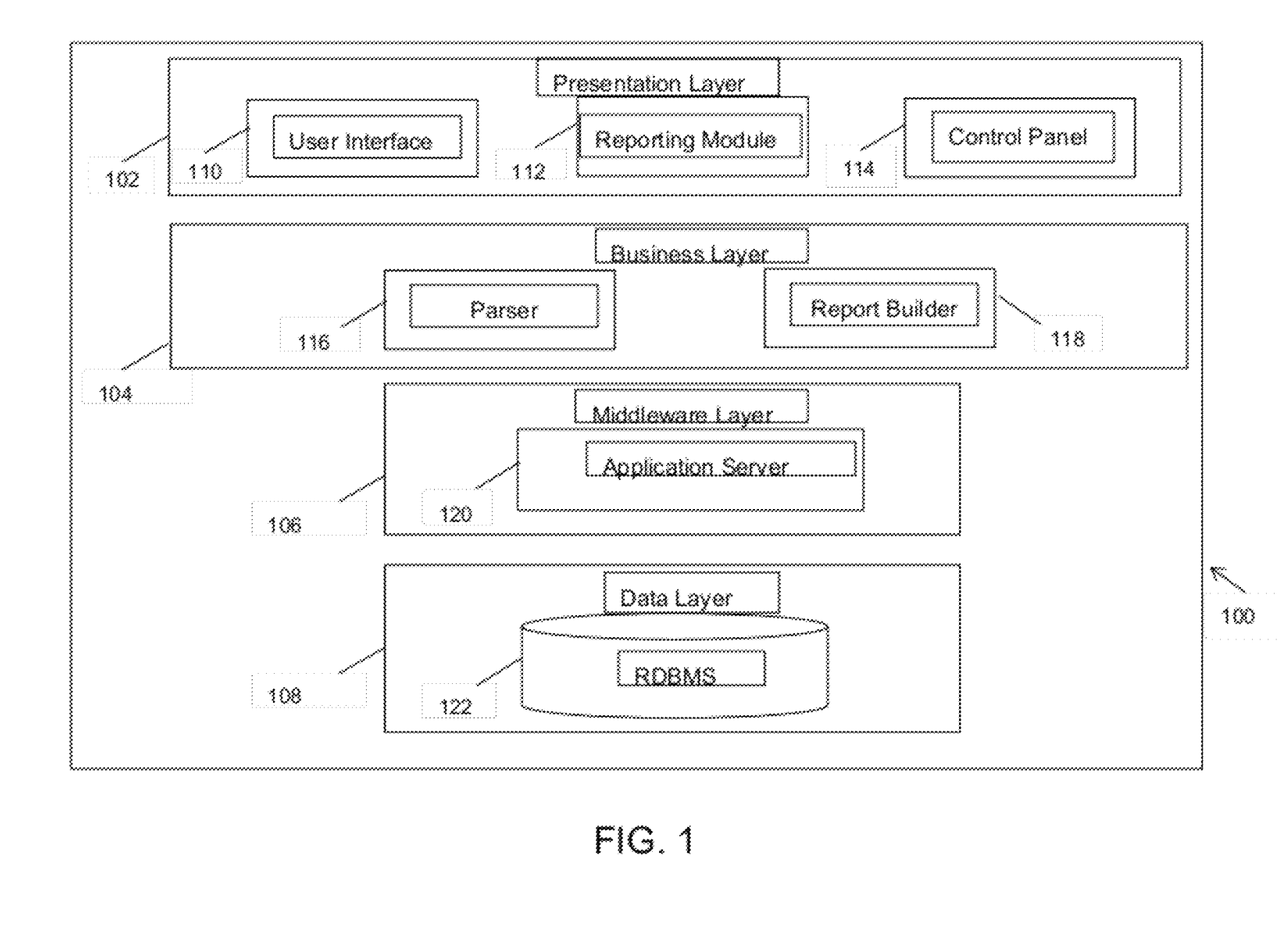
FIG. 1 illustrates an architectural diagram of an engine for reporting web standard non-compliance of a web page, in accordance with various embodiments of the present invention.

FIG. 1 illustrates an architectural diagram of a web standards non-compliance reporting engine 100, in accordance with various embodiments of the present invention. The system of the invention provides an HTML overlay report for web standard non-compliance of web pages of website or part of a website by parsing and scanning through the local copy of web pages to determine occurrences of web standard non-compliance corresponding to a predefined web accessibility guideline, and intelligently facilitates customizations of the HTML overlay report.

In various embodiments of the present invention, the architecture of the web standard non-compliance reporting engine comprises a presentation layer 102, a business layer 104, a middleware layer 106 and a data layer 108. The presentation layer 102 comprises a user interface 110, a reporting module 112, and a control panel 114. The user interface 110 is an interface arranged for receiving information from a user that is required to test the web standard non-compliance of web pages. The information received includes local copy of web pages to be tested for web standards non-compliance, and an accessibility guideline to be used in web standards non-compliance testing.

Figure 3:
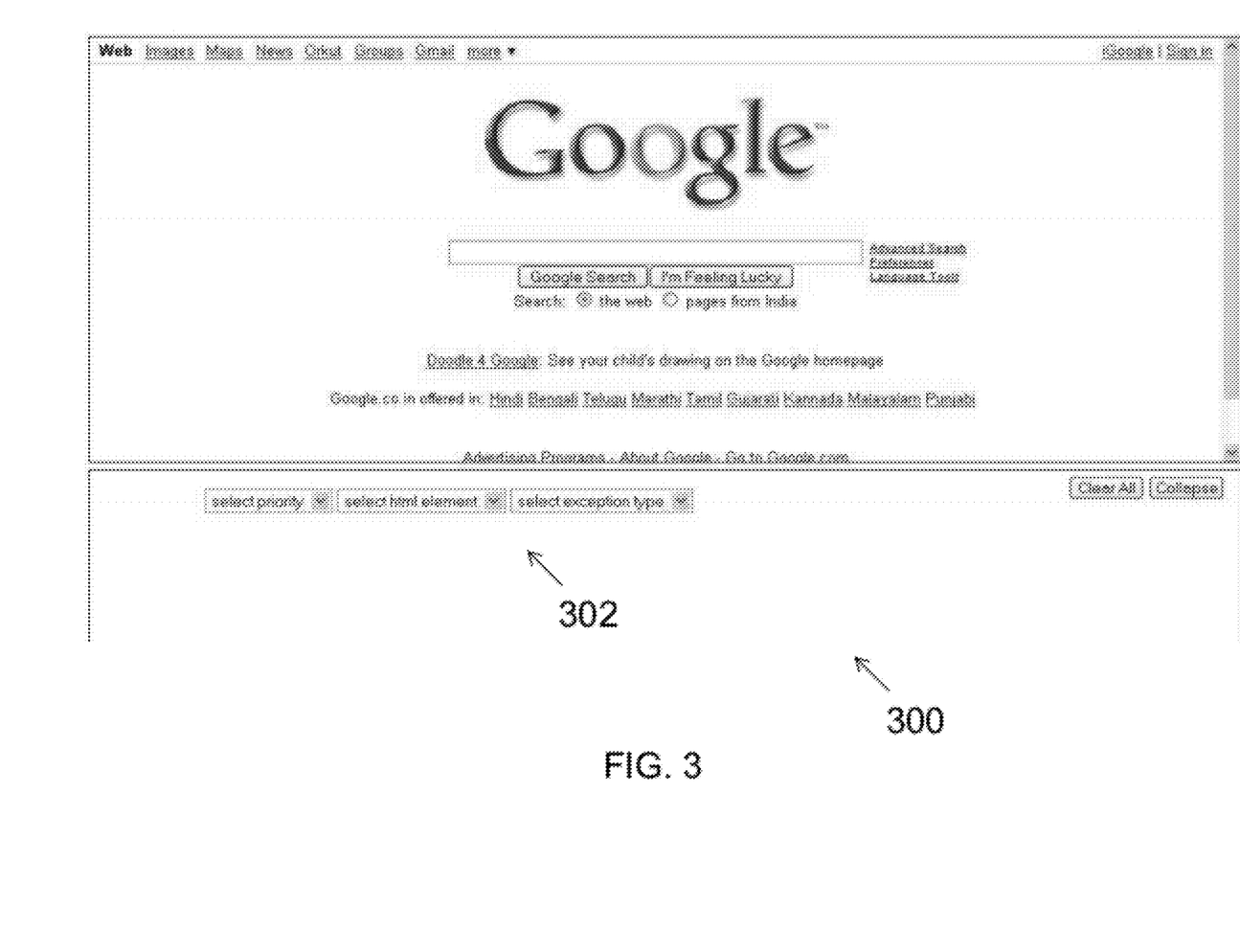
FIG. 3 illustrates an interface of Html Overlay report with a sample web page loaded for error marking prior to the marking of errors on the loaded web page.

In an embodiment of the present invention, accessibility guidelines are guidelines recommended by World Wide Web Consortium (W3C), an international standards organization, for making web content accessible to various kinds of users. Exemplary screenshot of the user interface 110 in various embodiments is illustrated in FIG. 3. In an embodiment of the present invention, the user interface 110 is developed using JavaServer Faces framework.

The reporting module 112 is a software module responsible for providing Hyper Text Markup Language overlay reports for web standard non-compliance to the user. The HTML overlay reports are easy to view HTML reports illustrating results of web standard non-compliance testing that are easily accessible by screen readers. A screen reader is a software application that identifies information displayed on a screen and presents the information to a user using text-to-speech sound icons, a Braille output device etc. Screen readers are useful tools for a person having visual disabilities to access information on a screen.

The control panel 114 is a set of controls generated dynamically based on the web standard for which the testing is conducted, the local copy of the web page loaded using the user interface 110 for web standard non-compliance testing and a set of errors generated on the web page corresponding to the accessibility guideline selected. The set of controls represent parameters specific to the web standards selected by the user. Users can use these controls to control viewing of the marker images by selecting independent or combined standard specific parameters to be considered for initiating the error marking on the web page. Using the intelligent control panel users can view the marker images in a planned manner avoiding ad-hoc display of all marker images at a time. The dynamically generated control panel helps in planned phase wise testing and maintenance of web standard non-compliance occurrences on HTML elements of a web page and expedites the process of report viewing. The set of marker images to be displayed on the web page are dependent upon the set of controls selected by the user from the dynamically generated intelligent control panel. Depending upon the set of controls selected from the control panel the Document Object Model of the local copy of web page loaded using the user interface 110 is parsed and maker images are placed adjacent to HTML elements which do not comply with the selected web accessibility guideline. The set of controls can also be used to remove the marker images dynamically from the loaded local copy of a web page.

The business layer 104 comprises a parser 116 and a report builder 118. The parser 116 is a software program that parses a local copy of a web page that has been selected for web standards non-compliance testing, for extracting HTML tags used in designing the webpage and mandatory fields on the webpage. The HTML tags are compared against rules and recommendations governed by web accessibility guidelines to conduct a web standards non-compliance testing corresponding to the web accessibility guidelines. The report builder 118 is configured to generate reports provided in the reporting module 112. In an embodiment of the present invention, the web standard non-compliance reporting engine is a search engine that runs a scan through local copy of each web page of a website. The scanning is executed based on keywords used for common HTML elements and associated contextual semantic content to determine features that do not meet accessibility guidelines. Based on the scan, the report builder 118 generates HTML overlay non-compliance test report.

The middleware layer 106 comprises an application server 120. The application server 120 is configured to receive information entered by a user through the user interface 110. The information which includes local copy of a web page and accessibility guideline is used by the application server 120 for running website scans.

The data layer 108 comprises a repository 122. The repository 122 is configured to store descriptions of the various web standard non-compliance exceptions. The repository 122 can be any known form of data repository. In an exemplary embodiment, the repository 122 is database using relational database management system.

In an embodiment of the present invention, a real time web page state is maintained of the local copy of the web page uploaded for web standard non-compliance testing. The real time web page state is maintained by downloading all the relevant files. The relevant files comprise required media files, script files, and style sheet files from the original URL of the web page. In an exemplary embodiment, the script files and style sheet files include JavaScript files and CSS files respectively. Maintaining a real time web page state for a local copy of an original web page creates a user experience of marking over the original web page.

Figure 2:
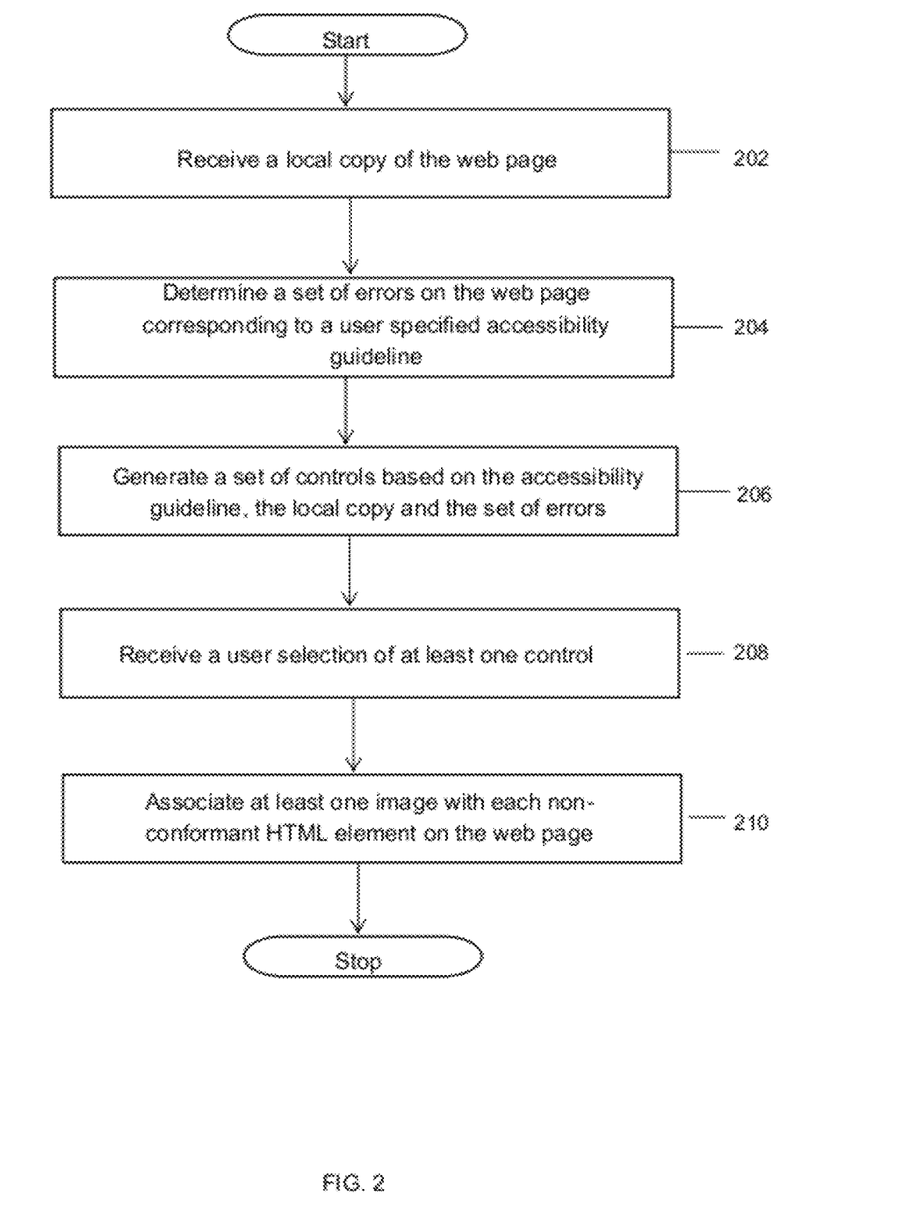
FIG. 2 illustrates a flow chart depicting method steps involved in reporting web standard non-compliance of a web page.

FIG. 2 illustrates a flowchart depicting method steps involved in testing a webpage for web standard non-compliance. In various embodiments of the present invention, the method for reporting web standard non-compliance of webpage for people with disabilities includes reading content of the webpage to be tested. The method steps involved in testing and reporting web standard non-compliance of a webpage include, at step 202, receiving a copy of a webpage to be tested stored locally on a computing device in the form of a file.

Thereafter, at step 204, the system of the invention determines a set of web standard non-compliance errors on the local copy of the webpage. The set of errors determined at step 204 are generated corresponding to a web accessibility guideline received from the user. In an embodiment of the present invention, the accessibility guideline may include one of Web Content Accessibility Guidelines (WCAG) V 1.0, WCAG 2.0, country specific guidelines such as Americans with Disabilities Act, Section 508 of the Rehabilitation Act of USA, Disability Discrimination Act of Australia, Disability Discrimination Act of UK, British Standards Institution's Publicly Available Specification (PAS78) guide to good practice in commissioning accessible websites, EU guidelines as well as number of guidelines from other countries.

At step 206, a dynamic set of controls is generated intelligently facilitating customization of the HTML overlay report thereby enabling the user to test a webpage for occurrences of web standard non-compliance in a planned phase-wise manner. In various embodiments of the present invention, the dynamic set of controls are generated corresponding to the accessibility guideline received from the user, the set of errors determined at step 204, and the local copy of the webpage received from the user at step 202. In various embodiments of the present invention, the set of generated controls comprises web accessibility parameters derived from the user specified accessibility guideline. Each accessibility guideline provides one or more web accessibility parameters or checkpoints for information rendered on a webpage in order to make the webpage accessible to one more disability groups. The one or more accessibility parameters include parameters related to design and use of Content (Examples: Audio, Graphics/Video), Comprehension, Presentation (Examples: Text, Color, Tables, Language), Navigation Structure (Site Structure, Links, Forms, Semantic Data, Help), User Controls (Time Limits, Updates, Focus), Technology Alternatives (Frames, JavaScript, CSS) etc. For example, with respect to accessibility parameters related to Content, according to guideline 1.1 of WCAG 2.0, text alternatives for non-text content should be provided so that it can be changed into other forms that people need, such as large print, braille, speech, symbols or simpler language. Similarly, for web accessibility parameters related to Presentation, WCAG 2.0 specifies guidelines for making web content easily distinguishable to users including use of color, audio control, contrast ratio for visual presentation of text and images of text etc.

At step 208, a user selection of a combination of one or more controls out of the set of controls generated at step 206 is received. In various embodiments of the present invention, the set of one or more selected controls facilitate testing and maintenance of web standard non-compliance of a webpage in a planned, phase wise manner. The set of one or more user selected controls enable a customization of the HTML overlay report to avoid ad-hoc display of all the instances of web standard non-compliance on a web page.

At step 210, one or more images are associated with each HTML element on the web page being tested for web standard non-conformance based on the set of errors determined at step 204, and one or more controls selected at step 208. Thus, an HTML overlay report which is generated based on the set of errors determined at step 204 for web standard non-compliance, can be customized based on one or a combination of controls selected at step 208 from the dynamically generated control panel 114.

FIG. 3 illustrates an interface of Html Overlay report 300 with a sample web page loaded for error marking prior to the marking of errors on the web page loaded. The HTML overlay report is an easy to view report for identifying web accessibility challenges in a webpage. In an embodiment of the present invention, the HTML overlay report loads a webpage that been assessed for web standard non-compliance. Thereafter, a report interface is overlaid on top of the HTML page providing a visual representation in the form of images associated for each HTML element non-compliant to one or more web standards. In an embodiment of the present invention, each image associated with the HTML elements represents a specific web standard non-compliance error and each possible web standard non-compliance error has a marker image representing it which ensures a high level of differentiation among the different marker images. In an exemplary embodiment of the present invention, the images are color coded corresponding to their criticality with respect to the different accessibility guidelines to differentiate the same kind of error across different web standards based on their criticality in order to assist users in quick identification of web standard non-compliance errors. Further, the figure also illustrates a dynamically generated intelligent control panel 302. The control panel is intelligent enough to load its controls depending on the web accessibility standard for which the testing is conducted, the local copy of the web page loaded using the user interface 110 and the set of errors determined on the web page corresponding to the web accessibility guideline. In an exemplary embodiment, the control panel comprises priority levels for web standard non-compliance errors, the set of HTML elements to be tested for web standard non-compliance, and the set of web standard non-compliance exception types. In various embodiments of the present invention the values for all the parameters contained within the control panel 302 are loaded dynamically corresponding to the web accessibility guideline selected by the user.

Figure 4:
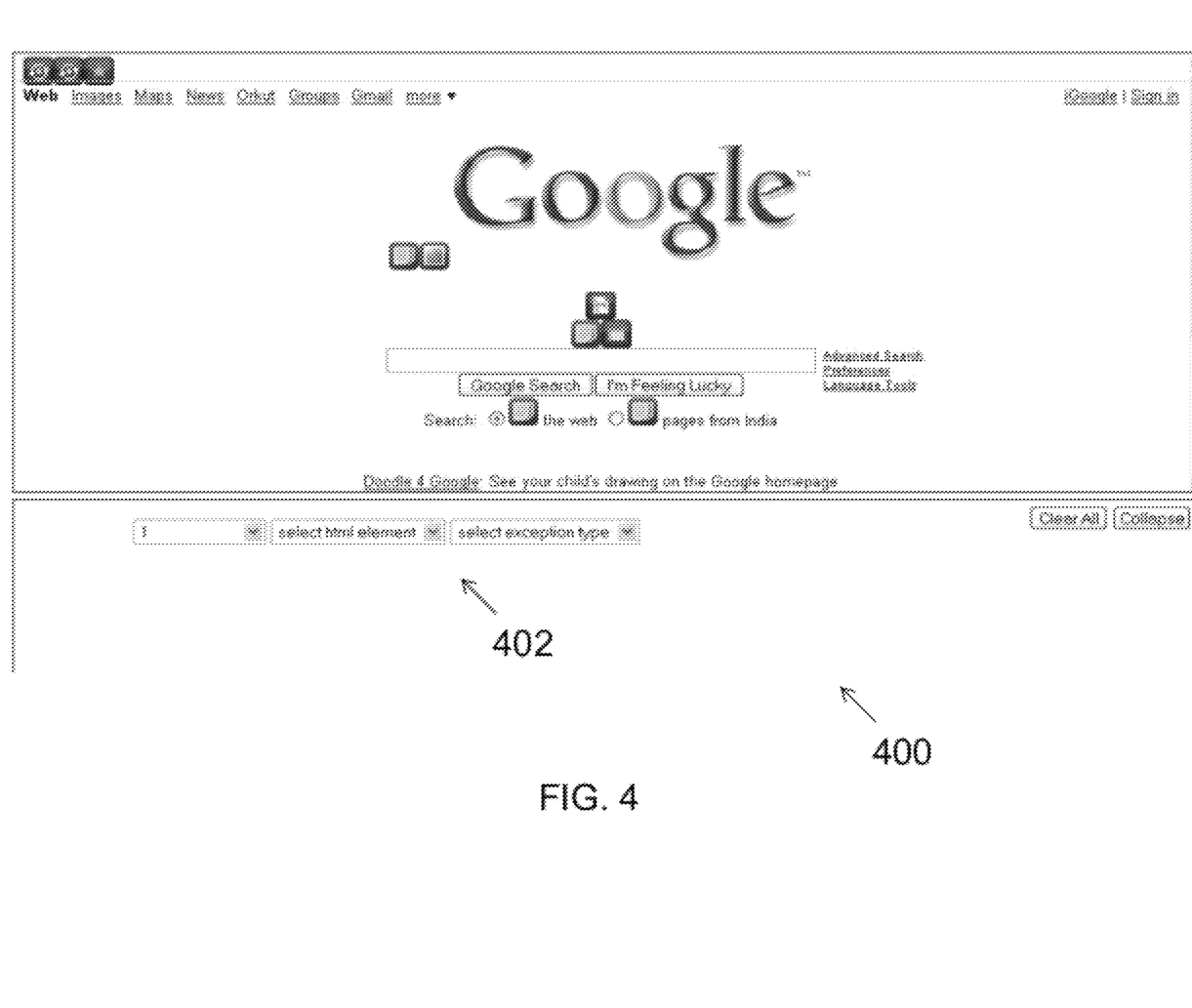
FIG. 4 illustrates an interface of Html Overlay report with marker images for a particular selection in control panel.

FIG. 4 illustrates an Html Overlay report interface 400 with marker images associated with web standard non-compliant HTML elements corresponding to a particular set of values selected for one or more parameters contained within the control panel 302. In an exemplary illustration shown in FIG. 4, a particular selection 402 in the control panel wherein a value corresponding to only the priority level parameter of the control panel has been selected and marker images have been associated with HTML elements having web standard non-compliance of the selected priority level corresponding to the accessibility guideline selected.

Figure 5:
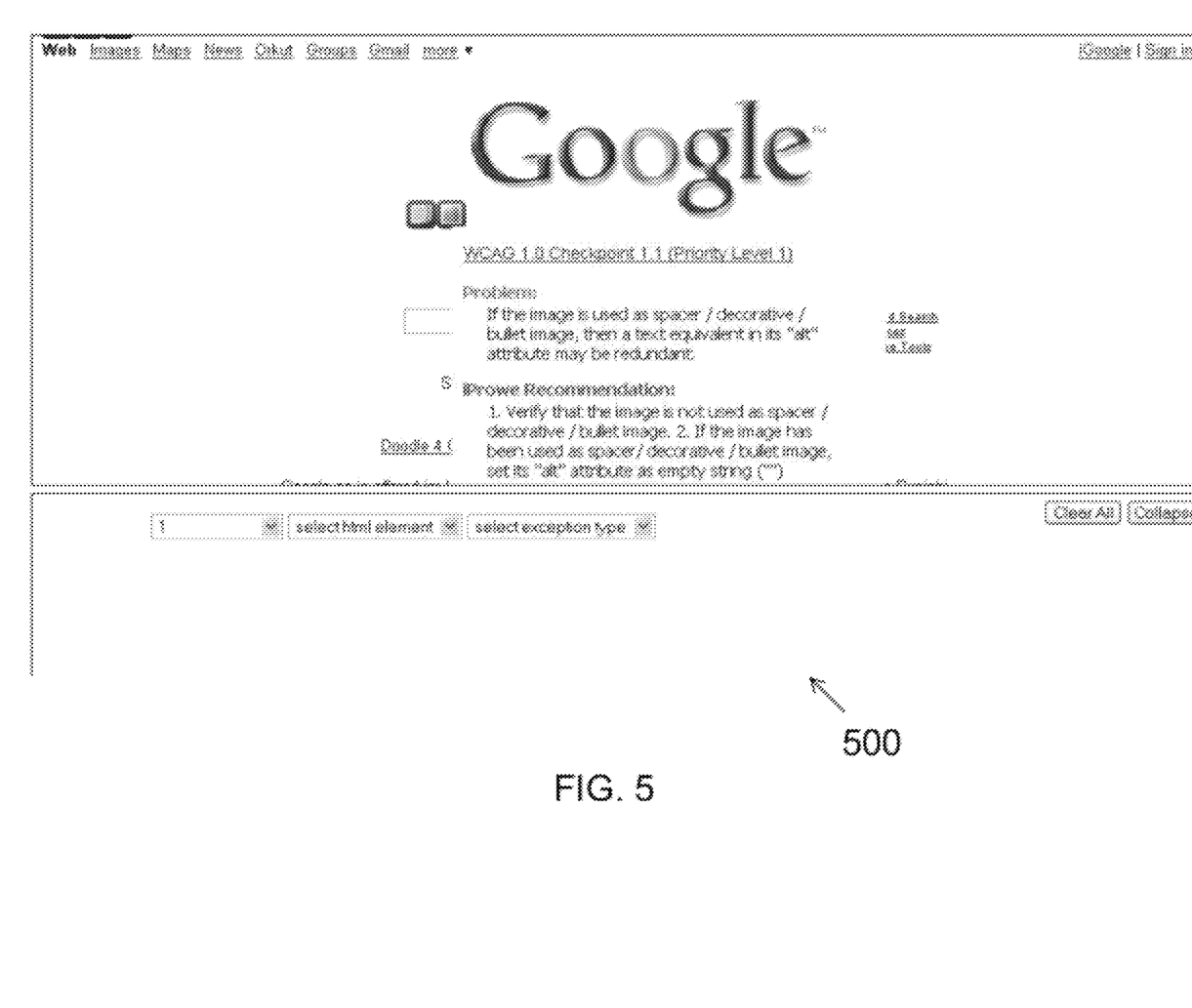
FIG. 5 illustrates an interface of Html Overlay report with popup containing the details of a specific web standard non-compliance exception.

FIG. 5 illustrates an Html Overlay report interface 500 with pop up details corresponding to web standards non-compliance exception. In various embodiments of the present invention, easy access to the complete details of a web standard non-compliance error is provided by a popup upon mouse-over event of the image elements used to mark the web standard non-compliance error points on the web page. In an exemplary embodiment of the present invention, the popup comprises an external link to the web standard definition, description of the error occurred and recommendation on resolving the error.

In an embodiment of the present invention, the system categorizes the web standard non-compliance associated with the HTML element either as an error, a warning or as an alert.

The present invention may be implemented in numerous ways including as a system, a method, or a computer readable medium such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

What is claimed is:

1. A system for reporting web standard non-compliance of a web page, the system comprising:
   a user interface configured to receive a local copy of the web page to be tested for web standard non-compliance, wherein the local copy is downloaded along with relevant files from the web page;
   a parser configured to parse Document Object Model of the local copy of the web page to extract one or more HTML elements, wherein an HTML element is extracted in order to test the web standard non-compliance of the HTML element to one or more accessibility parameters derived from a user specified accessibility guideline;
   an application server configured to run scans on the local copy of the web page and generate a set of web-standard non-compliance errors corresponding to the user specified accessibility guideline;
   a reporting module configured to present an HTML overlay report for representing web standard non-compliance errors, wherein the HTML overlay report is accessible by a screen reader; and
   a control panel comprising a dynamically generated set of controls, the set of controls being generated using the user interface based on the user specified accessibility guideline, the local copy and the set of errors, and
   a screen of the user interface that includes, simultaneously presented, the control panel with the dynamically generated set of controls and the HTML overlay report,
   wherein the control panel is used by a user for:
      (i) selecting at least one control of the set of controls on the screen for dynamically deriving the one or more accessibility parameters to generate the set of web-standard non-compliance errors,
         wherein the set of web-standard non-compliance errors are generated based on the at least one control selected by the user, and
         further wherein parsing the Document Object Model of the local copy of the web page is performed based on the at least one control selected by the user,
      (ii) categorizing the web standard non-compliance errors either as an error, a warning or as an alert, and (iii) customizing the HTML overlay report by placing at least one image adjacent to each HTML element on the web page corresponding to the set of errors and the at least one selected control, and removing marker images dynamically from the local copy.

2. The system of claim 1, wherein the web standard non-compliance reporting is offered as an internet service.

3. The system of claim 1, wherein the web standard non-compliance reporting is offered as an intranet service.

4. The system of claim 1, wherein the web standard non-compliance reporting is offered as an offline service.

5. The system of claim 1, wherein the web standard non-compliance reporting is provided in a SaaS mode, wherein customers pay for web standard non-compliance reporting services based on usage.

6. The system of claim 1, wherein the user specified accessibility guideline is at least one of WCAG 1.0, WCAG 2.0, ADA, DDA UK, DDA Australia and Section 508.

7. The system of claim 1, wherein the set of controls comprises accessibility parameters derived from the user specified accessibility guidelines.

8. The system of claim 1, wherein the at least one image represents a specific web standard non-compliance error.

9. The system of claim 8, wherein the at least one image is color coded corresponding to its criticality with respect to the different accessibility guidelines.

10. The system of claim 1, wherein the customized HTML overlay report further comprises details of the one or more errors associated with each HTML element on the web page.

11. The system of claim 10, wherein the details comprises a description of the error stored in a repository.

12. The system of claim 10, wherein the details comprises an address to the accessibility guideline definition.

13. The system of claim 1 further comprising a report builder configured to generate an HTML overlay report, and further configured to provide the report to the reporting module for presentation.

14. The system of claim 1, wherein the relevant files comprises media files, script files and style sheet files.

15. The system of claim 1 further comprising providing recommendations for remedying the one or more errors associated with each HTML element on the web page.

16. A method for reporting web standard non-compliance of a web page, the method comprising:
receiving a local copy of the web page and parsing Document Object Model of the local copy to extract one or more HTML elements to be tested for web standard non-compliance wherein the local copy is downloaded along with relevant files from the web page;
generating a set of web-standard non-compliance errors on the local copy of the web page corresponding to a user specified accessibility guideline, wherein an HTML overlay report is generated based on the set of errors and is accessible by a screen reader;
generating a control panel comprising a dynamically generated set of controls, the set of controls being generated using a user interface based on the user specified accessibility guideline, the local copy and the set of errors;
simultaneously presenting, on a screen of the user interface, a control panel with the dynamically generated set of controls and the HTML overlay report;
selecting at least one control from the set of controls on the screen for dynamically deriving the one or more accessibility parameters to generate the set of web-standard non-compliance errors,
wherein the set of web-standard non-compliance errors are generated based on the at least one control selected by the user, and
further wherein parsing the Document Object Model of the local copy of the web page is performed based on the at least one control selected by the user;
selecting at least one control from the set of controls for categorizing the web standard non-compliance associated with the HTML element either as an error, a warning or as an alert; and
selecting at least one control from the set of controls for customizing the HTML overlay report by placing at least one image adjacent to each HTML element on the web page corresponding to the set of errors and the at least one selected control, and removing marker images dynamically from the local copy.

17. The method of claim 16, wherein the user specified accessibility guideline is at least one of WCAG 1.0, WCAG 2.0, ADA, DDA UK, DDA Australia and Section 508.

18. The method of claim 16, wherein the set of controls comprises accessibility parameters derived from the user specified accessibility guidelines.

19. The method of claim 16, wherein the at least one image represents a specific web standard non-compliance error.

20. The method of claim 19, wherein the at least one image is color coded corresponding to its criticality with respect to the different accessibility guidelines.

21. The method of claim 16 further comprising providing details of the one or more errors associated with each HTML element on the web page.

22. The method of claim 21, wherein the details comprises a stored description of the error.

23. The method of claim 21, wherein the details comprises an address to the accessibility guideline definition.

24. The method of claim 16, wherein the relevant files comprises media files, script files and style sheet files.

25. The method of claim 16 further comprising providing recommendations for remedying the one or more errors associated with each HTML element on the web page.

26. A computer program product comprising a non-transitory computer usable medium having a computer readable program code embodied therein for reporting web standard non-compliance of a web page, the computer program product comprising:
program instruction means for receiving a local copy of the web page to be tested for web standard non-compliance, wherein the local copy is downloaded along with relevant files from the web page;
program instruction means for parsing Document Object Model of the local copy of the web page to extract one or more HTML elements;
program instruction means for running scans and generating a set of errors on the local copy of the web page for web standard non-compliance corresponding to one or more accessibility parameters derived from a user specified accessibility guideline;
program instruction means for providing an HTML overlay report to the user, wherein the HTML overlay report is accessible by a screen reader;
program instruction means for generating a control panel comprising a dynamically generated set of controls, the set of controls being generated using the user interface based on the user specified accessibility guideline, the local copy and the set of errors;
program instruction means for generating a screen of the user interface that includes, simultaneously presented, the control panel with the dynamically generated set of controls and the HTML overlay report, program instruction means for receiving a set of one or more controls on the screen selected by the user for:
(i) dynamically deriving the one or more accessibility parameters to generate the set of web-standard non-compliance errors,
    wherein the set of web-standard non-compliance errors are generated based on the at least one control selected by the user, and
    further wherein parsing the Document Object Model of the local copy of the web page is performed based on the at least one control selected by the user,
(ii) categorizing the web standard non-compliance associated with the HTML element either as an error, a warning or as an alert, and
(iii) customizing the HTML overlay report by placing at least one image adjacent to each HTML element on the web page corresponding to the set of errors and the set of controls, and removing marker images dynamically from the local copy, wherein customizing the HTML overlay report includes adjusting, based on the at least one control selected by the user on the screen, which HTML elements have at least one image placed adjacent thereto on the HTML overlay report on the screen.

27. The computer program product of claim 26 further comprising program instruction means for providing details of the one or more errors associated with each HTML element on the web page.

28. The computer program product of claim 27, wherein the detail comprises a description of the error stored in a repository.

29. The computer program product of claim 27, wherein the detail comprises an address to the accessibility guideline definition.

30. The computer program product of claim 26 wherein the relevant files comprises media files, script files and style sheet files.

31. The computer program product of claim 26 further comprising program instruction means for providing recommendations for remedying the one or more errors associated with each HTML element on the web page.

32. The system of claim 1, wherein the dynamically generated set of controls includes at least two controllable menus for receiving user input to manipulate the HTML overlay report.

33. The system of claim 1, wherein the dynamically generated set of controls includes a priority selector, and HTML element selector indicating HTML elements of the one or more HTML elements to be tested, and an exception type selector.

* * * * *